United States Patent Office 2,735,825
Patented Feb. 21, 1956

2,735,825

SILICONE-ALKYD COATING COMPOSITION

Bernard H. Kress, Toledo, Ohio, assignor, by mesne assignments, to Allied Chemical & Dye Corporation, New York, N. Y., a corporation of New York No Drawing. Application October 4, 1952,
Serial No. 313,193

11 Claims. (Cl. 260—22)

The invention relates to a silicone-modified alkyd resin coating composition that produces coatings of superior weather and chemical resistance.

Silicone-modified alkyd resins are of great potential commercial importance for use in coating compositions, because of the weather resistance and chemical resistance that is imparted to a cured silicone-modified alkyd resin by its silicone content. However, the properties of a coating containing any alkyd resin are not satisfactory until the coating has been properly cured, by baking or air-drying, and the silicone content of the silicone-modified alkyd resins heretofore known has interfered with the curing of coatings containing such resins.

The difficulty experienced in curing the silicone-modified alkyd resins heretofore known might have been overcome if it had been possible to increase the temperatures at which coatings containing such resins were cured. However, increasing the temperature at which a coating is cured sharply increases the cost of the coating operation. Moreover, the temperature at which a coating can be cured is usually limited by the nature of the coating or the nature of the work to be coated. For architectural work, a coating must be curable by air-drying at ordinary temperatures. Even the temperature at which a baking enamel is cured cannot be raised without danger of discoloring the enamel.

Furthermore, the silicone-modified alkyd resins heretofore known have had very limited solubility in the aliphatic hydrocarbon solvents used in ordinary air-drying finishes. Although such silicone-modified alkyd resins have been soluble in aromatic hydrocarbon solvents, the latter solvents, because of their toxicity, cannot be used in air-drying finishes for ordinary applications such as interior decorating.

Because of the limited curability of the silicone-modified alkyd resins heretofore known and their limited solubility in aliphatic hydrocarbons, it has been necessary to limit severely the silicone content of such alkyd resins. Such limitation of the silicone content of the resins has made it impossible to achieve more than a small fraction of the improvement in weather resistance and chemical resistance that would have been imparted by a more substantial silicone content.

The principal object of the invention is to provide a novel silicone-modified alkyd coating composition that has a high silicone content so that it produces coatings of remarkable weather resistance and chemical resistance, and yet has unimpaired curability and is soluble in aliphatic hydrocarbon solvents. More specific objects and advantages are apparent from the description, which illustrates and discloses but is not intended to limit the scope of the invention.

It is known that products made from alkyl-silicones are not as durable as products made from arylsilicones. Moreover, it has been found to be extremely difficult and often impossible to react alkylsilicones with alkyd resins, whereas arylsilicones react readily with alkyd resins to produce silicone-modified alkyd resins. However, it has been found that reaction of an arylsilicone with an alkyd resin tends to destroy the compatibility of the resin with aliphatic hydrocarbon solvents.

The present invention is based upon the discovery that although it is extremely difficult and often impossible to react an alkyd resin with the products of the hydrolysis of an aliphatic silane, it is possible without difficulty to react an alkyd resin simultaneously with low molecular weight, acidic products of the hydrolysis of both an aromatic silane and an aliphatic silane, and upon the further discovery that although an alkylsilicone ordinarily produces resins of inferior stability or shelf-life that give coatings of inferior durability, the use of products of the hydrolysis of both an aliphatic silane and an aromatic silane in producing the silicone-modified alkyd resin of the present invention remarkably enhances the durability of coatings produced from such alkyd resin and does not impair the stability of the resin. It has been discovered further that such alkyd resin is unique in that it not only produces coatings of outstanding durability but also has unimpaired curability and is soluble in the aliphatic hydrocarbon solvents which it is necessary to use for ordinary applications of air-drying coating compositions.

In order to obtain these improvements, it is necessary that the products of the hydrolysis of the aromatic silane and the aliphatic silane be reacted with the alkyd instead of being merely mixed with the alkyd. If the products of the hydrolysis are merely mixed with the alkyd, the rate of air-drying is impaired, the hardness and durability of the coatings are unsatisfactory, and the resulting blended solution is of highly unpredictable stability.

The remarkable improvement in the durability of coatings produced from an air-drying silicone-modified alkyd resin of the present invention that results from the use of acidic products of the hydrolysis of both an aromatic silane and an aliphatic silane in preparing the resin has been demonstrated as follows:

(a) A hydrolysis product prepared as in Example I, infra, was mixed with a soya-modified glycerol phthalate alkyd resin, prepared by the following procedure: Degummed soya oil (1100 grams), glycerol (166 grams), pentaerythritol (62 grams) and litharge (1.2 grams) were heated in a flask fitted with a condenser and an inlet tube through which a moderate stream of carbon dioxide was passed over the surface of the reaction mixture, for one hour at a temperature of 235 degrees C. The solution was then cooled and phthalic anhydride (440 grams) and maleic anhydride (23 grams) were added. The resulting mixture was heated for six hours at 240 degrees C. and was then cooled. "Varnolene" (mineral spirits) was added to 420 grams of the resulting resin to dilute the resin to a 70 per cent solids concentration. The acid number of the resulting solution was 4, the color 6 (Gardner-Holdt) and the viscosity $Z_1$ (Gardner-Holdt). The mixture of the xylene solution of the hydrolysis products and the 420 grams of alkyd resin (diluted with mineral spirits) was placed in a flask equipped with a Dean-Stark trap, and xylene was distilled while the solution was maintained in gentle reflux for about two hours, until a sample of the resin solution formed a clear film on a glass plate upon baking for five minutes at 350° C. Varnolene was then added to dilute the product to sixty per cent solids. The resulting silicone-modified alkyd solution embodying the invention had a color of 6 (Gardner-Holdt), a viscosity of V (Gardner-Holdt) and an acid number of 5.8 (based on resin solids).

(b) A soya-modified alkyd resin prepared as described in (a) was diluted to 60 per cent solids with Varnolene to produce another solution for use as a control.

(c) The procedure described in (a) was repeated except that the ingredients used in preparing the solution of the hydrolysis products were phenyltrichlorosilane (290 grams), xylene (290 ml.) and water (1600 ml.), and the xylene layer was washed with two 320 ml. portions of water. When the xylene solution of the hydrolysis products was refluxed with the alkyd resin, the mixture immediately set to a thick incompatible mass. This showed that the arylsilicone produced an incompatible product even though the total amount of silicone used was 10% less than in (a).

(d) Therefore, to reduce the amount of arylsilicone to a proportion small enough to permit a compatible product to be obtained, the procedure described in (a) was repeated except that the ingredients used in preparing the solution of the hydrolysis products were phenyltrichlorosilane (77 grams), xylene (77 ml.) and water (450 ml.), and the xylene layer was washed with two 85 ml. portions of water.

(e) The procedure described in (a) was repeated except that the ingredients used in preparing the solution of the hydrolysis products were ethyltrichlorosilane (280 grams), xylene (280 ml.) and water (1550 ml.), and the xylene layer was washed with two 300 ml. portions of water. When the xylene solution of the hydrolysis products was refluxed with the alkyd resin, successive samples removed from the mixture and baked on glass plates for five minutes at 350° F. failed to form clear films, and the mixture gelled to a worthless mass after one hour of refluxing.

A 100 gram sample of each solution prepared as described in (a), (b) and (d) was ground with 60 grams of rutile (Du Pont R610), a naphthenate drier solution (containing 0.6 gram of lead and 0.08 gram of cobalt) and 40 grams of Varnolene. Each of the resulting air-drying enamels was sprayed on a steel panel. Table I (below) shows the periods of time at ordinary temperatures after which each enamel was "set to touch" and "dry," as defined by Sec. 2,000 of Federal Specification No. TT-P-141b of January 15, 1949, relating to "Paint, Varnish, Lacquer and Related Materials; Methods of Inspection, Sampling and Testing." Each panel then was exposed outdoors in southern Florida. Table I shows the initial gloss of each panel, and the number of months of weathering required to cause the gloss of each panel to decrease to a value of 30. The gloss readings were taken with a Gardner gloss meter in which the gloss is read at an angle of 60°, using a scale based on a maximum gloss of 96 for black glass.

TABLE I

| Silicone-Modified Alkyd | Hours to Set | Hours to Dry | Initial Gloss | Months to Reach 30 Gloss |
|---|---|---|---|---|
| (a) (from ethyl and phenyl silanes) | 1½ | 6½ | 91 | 11 |
| (b) (control) | 1½ | 6 | 87 | 7.0 |
| (d) (from phenyl silane alone) | 2 | 6 | 89 | 7.5 |

It is evident from the foregoing demonstration that the silicone-modified alkyd resin solution of the present invention prepared as described in (a) produced coatings having a life 57 per cent longer than coatings of the unmodified alkyd resin. The value of 57 per cent is conservative because the life of coatings produced from compositions embodying the invention is usually at least 100 per cent greater than the life of coatings produced from the unmodified alkyds. It is evident also that the coatings produced from the silicone-modified alkyd resin solution of the invention had an original gloss greater than that of coatings produced from the unmodified alkyd resin.

It has been found also that in the practice of the present invention there is attained an improvement in the preservation of the integrity of the coatings similar to the improvement in the retention of gloss.

In contrast, the foregoing demonstration shows that the limited amount of phenylsilicone that it was possible to react with an alkyd resin in the procedure described in (d) caused an increase of less than ten per cent in the life of the air-dried enamel. This small increase in the life of the enamel would not justify the expense of reacting the original alkyd resin with the phenylsilicone.

On the other hand, when an attempt was made to react a larger proportion of phenylsilicone with the alkyd resin in the aliphatic hydrocarbon solution as described in (c), the mixture set to a thick incompatible mass. The attempt to react an ethylsilicone with the alkyd resin as described in (e) was also unsuccessful.

Coatings produced from compositions embodying the invention are equal or superior to unmodified alkyd resin coatings in resistance to solvents, resistance to salt spray, hardness and other physical properties. Moreover, a second coat may be applied to a coating produced from a composition embodying the invention at any time with satisfactory adhesion.

The superiority of the silicone-modified alkyds of the present invention to unmodified alkyds in moisture resistance and weather resistance is outstanding.

A coating composition embodying the invention, which produces coatings of superior weather and chemical resistance, comprises an aliphatic hydrocarbon solution of the product of the heat-condensation of (1) an oil-modified alkyd resin with (2) a completely hydrolyzed acidic siloxanol containing alkyl and aryl groups directly attached to different silicon atoms, said siloxanol containing from two to three alkyl and aryl groups for every two silicon atoms, and containing from one to twenty-eight alkyl groups for every eight aryl groups, and the weight of said siloxanol, on a fully condensed basis, constituting from 15 to 50 per cent of said condensation product.

The preparation of silicone-modified alkyd resins of the invention may be carried out in the same manner as the preparation of the known silicone-modified alkyds. Ordinarily a mixture of the desired silanes first is hydrolyzed, and the resulting siloxanol then is incorporated in a product of the reaction of a polyhydric alcohol, a drying oil acid and a polycarboxylic acid, and the resulting mixture is heated to form a silicone-modified alkyd resin of the invention. Although the foregoing procedure is strongly preferred, resins of the invention also may be produced by incorporating, either with a polyhydric alcohol and a polycarboxylic acid, or with a polyhydric alcohol before a polycarboxylic acid is reacted with it, a mixture of hydrolyzable organosilanes (or a solution of the hydrolysis products thereof, i. e., silanols or siloxanols) or organosiloxanes having hydrolyzable groups attached to silicon atoms (the term "organosilicon reactants" being used hereinafter to include all of such substances), in proportions such as to produce a product having the composition hereinbefore described, and heating the resulting mixture to form a reaction product. When this procedure is employed, care should be taken to avoid excessive condensation of silanols, which would cause gelling and prevent the silanols from reacting with the other components. When the polyhydric alcohol, the polycarboxylic acid, the drying oil or drying oil acid and the organosilicon reactants are reacted together, the resulting product is a silicone-modified alkyd resin of the invention; when the polyhydric alcohol and the organosilicon reactants are reacted together, the resulting product is further reacted with a polycarboxylic acid and a drying oil or drying oil acid to produce a silicone-modified alkyd resin of the invention.

In order to produce a drying oil-modified alkyd resin, for reaction with a siloxanol, at least one drying oil fatty acid is reacted with a polyhydric alcohol, either at the same time when the polycarboxylic acid is reacted with the polyhydric alcohol, or before or after the polycarboxylic acid is reacted with the polyhydric alcohol. Examples of the drying oil fatty acids that are used to produce alkyds include linoleic and linolenic acids. Commercial alkyds are available having an excess of hydroxyl groups (over the total number of carboxyl groups in the fatty acids and polycarboxylic acids) ranging from about 2 to about 40 per cent, and having a ratio of fatty acid to polycarboxylic acid ranging from about one equivalent of fatty acid to four equivalents of polycarboxylic acid up to about three equivalents of fatty acid to five equivalents of polycarboxylic acid. The drying oil fatty acids are available commercially as their glycerol esters, which are oils derived from natural sources; examples of drying oils that provide sources for such fatty acids include soybean oil, linseed oil, dehydrated castor oil, poppy oil, hempseed oil, tung oil and safflower oil. Usually the oil itself is added to the reaction mix to provide the fatty acid or acids.

It is believed that, whatever the method of preparation, resins of the invention have a structure which is similar to that of an ordinary oil-modified alkyd resin except that some of the alcoholic hydroxy groups of the oil-modified alkyd resin have been replaced by

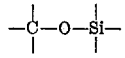

linkages. When a resin of the invention is produced by any method, the ratios of the various components of the resin to each other should be about the same as when an alkyd resin is produced first and then mixed with organosilicon reactants and heated. Consequently, although the following discussion is in terms directed to preparing an oil-modified alkyd resin and then modifying that resin to produce a silicone-alkyd resin, it is equally applicable when the ingredients of the silicone-alkyd resin are reacted in a single step, or when a polyhydric alcohol is reacted first with the organosilicon reactants and then with a drying oil acid and a polycarboxylic acid.

Alkyd resins with comparatively low acid numbers (usually not higher than about 10) are desirable because they do not react with the pigments ordinarily employed; an alkyd resin with a high acid number may also be unsuited for use with nitrocellulose. The preferred alkyd resins are (drying-oil modified) aromatic dicarboxylic acid glycerides, the most desirable examples being phthalic glycerides. In addition to modification with drying oil fatty acids, as hereinbefore described, modification of an alkyd resin that is essentially an aromatic dicarboxylic acid glyceride with other polycarboxylic acids or polyhydric alcohols, or both, may be desirable. It is usually desirable that the ratio of OH groups derived from the aromatic dicarboxylic acid, the fatty acid and the glycerol to total OH groups in the ingredients reacted to produce the alkyd resin be at least about 9:10.

A commercial air-drying alkyd resin usually is in the form of a solution in an aliphatic hydrocarbon solvent, frequently a petroleum solvent (e. g., "Varnolene," a fraction obtained in the distillation of petroleum, boiling between 310° F. and 410° F., which consists substantially of high boiling aliphatic hydrocarbons), or an aliphatic hydrocarbon such as a heptane, or an octane. Most commercial alkyd solutions have from about 50 to about 70 per cent solids, but the alkyds can be diluted by adding additional solvent, or a non-commercial alkyd may be used having any desired solids content. It is ordinarily economically preferable that an alkyd used in the practice of the invention contain from about 40 to 100 per cent solids; using more dilute alkyds ordinarily requires distillation of an unreasonable amount of solvent during the heating of the resin in the production of a silicone-modified alkyd resin of the invention.

HYDROLYZABLE ORGANOSILANES

A hydrolyzable aliphatic silane (one or a mixture of which is used in the preparation of a resin of the present invention) may be any substance whose molecule consists of a silicon atom to which are attached four monovalent groups, from one to two of which are primary, secondary or tertiary alkyl groups each having from one to twelve carbon atoms, from one to three of which are hydrolyzable groups, and not more than two of which are hydrogen.

A hydrolyzable aromatic silane (one or a mixture of which is used in the preparation of a resin of the present invention) may be any substance whose molecule consists of a silicon atom to which are attached four monovalent groups, from one to three of which are hydrolyzable groups, one of which is an aryl group having from six to twelve carbon atoms, and not more than two of which are hydrogen.

"Aryl group" as used herein means a group consisting of from one to two benzene nuclei containing from six to twelve carbon atoms (e. g., a phenyl, naphthyl or diphenyl group) and having no substituents. If desired the aromatic silane may contain a substituted aryl radical having from one to five substituents each of which is a halogen atom having an atomic weight less than 80 (fluorine, chlorine or bromine) or an alkyl group having not more than six carbon atoms.

"Hydrolyzable group" is used herein to mean a halo, alkoxy, amino, aroxy or acyloxy group. For best results, the hydrolyzable groups should be chloro groups.

The preferred aliphatic silane for use in the practice of the present invention is an alkyltrichlorosilane or other monoalkylsilane having three hydrolyzable groups attached to each silicon atom, in which the alkyl group is a primary alkyl group having from two to five carbon atoms. The preferred aromatic silane for use in the practice of the present invention is phenyltrichlorosilane or another monophenylsilane whose molecule has three hydrolyzable groups attached to the silicon atom. Superior results are obtained in the practice of the invention when these preferred silanes are employed.

PROPORTIONS OF SILANES

In a mixture of hydrolyzable silanes used in the practice of the invention, the ratio of the total number of aliphatic groups to the total number of aromatic groups may range from 1:8 to 7:2. Preferably such ratio is between 1:3 and 4:3. It has been found that the best results in the practice of the invention are obtained when such ratio is at least 2:3.

In a mixture of hydrolyzable silanes used in the practice of the invention, the r/Si ratio may be from 1.0 to 1.5, but preferably is not more than 1.25. ("r/Si ratio" is used herein to indicate the total number of non-hydrolyzable groups attached to silicon atoms in the molecules of the silanes divided by the total number of silicon atoms.)

HYDROLYSIS OF SILANES

The hydrolysis may be conducted by adding the hydrolyzable mixtures of silanes to a hydrolyzing solution. The addition should be made at a rate sufficiently slow that the exothermic hydrolysis reaction does not cause local overheating. It is usually desirable, also, that the hydrolyzing solution be stirred during the silane addition; otherwise, local overheating may result in spite of a slow rate of silane addition. In any event, the hydrolysis of the hydrolyzable groups should be carried to completion, so as to produce a "completely hydrolyzed" product.

The hydrolyzing agent may be water alone or (in the case of less readily hydrolyzed silanes) an aqueous solution of a mineral acid. Halosilanes are readily hydrolyzed by water alone, and it is often desirable to hydrolyze them with a water-ice slurry; the hydrolysis produces a hydrohalic acid which then serves as a catalyst for further hydrolysis. Amino, acyloxy, aroxy and alkoxy groups are progressively more difficult to hydrolyze, and amino groups are more difficult to hydrolyze than halo groups. It is usually desirable to use a dilute aqueous solution of a mineral acid as the hydrolyzing agent with silanes having hydrolyzable groups which consist of amino, acyloxy or aroxy groups. Alkoxy groups are more difficult to hydrolyze than are any of the other four so that a more drastic hydrolysis reaction is desirable; the more drastic hydrolysis reaction may be provided by a higher temperature, or by use of a stronger aqueous mineral acid solution as the hydrolyzing agent, or by use of little or no solvent (for the silanes), which serves as a diluent. The mineral acids that are used as hydrolysis catalysts include hydrochloric, sulfuric and phosphoric, hydrochloric usually being preferred. The amount of hydrolyzing solution that is used includes at least enough water to effect complete hydrolysis of the silanes (i. e., at least one gram mol of water for every two gram atoms of hydrolyzable groups in the silanes to be hydrolyzed). It is usually advantageous to use a considerable excess of water, e. g., from 5 to 10 gram mols for every two gram atoms of hydrolyzable groups, but it is ordinarily not advantageous to use more than about 20 gram mols of water for every two gram atoms of hydrolyzable groups. In all cases the hydrolysis is carried out under acidic conditions( at a pH below 7.0) to produce an acidic siloxanol.

It is usually desirable to dissolve the silanes in a solvent. Suitable solvents include ethers such as diethyl, ethylpropyl, dipropyl and propylbutyl ethers, and cyclic ethers such as dioxane; hydrocarbon solvents such as benzene, toluene, xylenes, hexanes, heptanes, and octanes; ketones such as acetone, methylethylketone and diethylketone; and alcohols such as methyl alcohol, ethyl alcohol, propyl alcohols and butyl alcohols. However, the preferred solvent is an organic solvent having a boiling point below 200° C. that forms a two-phase system with the water used for hydrolysis, which organic solvent has a molecular structure containing from one to two oxygen atoms which are connected only to carbon atoms and at least one of which is contained in a carbonyl radical connected to two polyvalent atoms of the class consisting of carbon and oxygen atoms, said oxygen atoms if more than one in number being contained in an ester linkage. Such a solvent may be an aliphatic monocarboxylic acid ester or aliphatic ketone. The use of these solvents is disclosed in my copending application Serial No. 221,947, filed April 19, 1951.

A solvent that is used in the hydrolysis of silanes to produce siloxanols for reaction with alkyd resins should not be substantially soluble in water, in order to avoid great losses of the solvent solution of the silane hydrolysis products. Thus, the phrase "forms a two-phase system with the water used for hydrolysis" is used herein to mean that the solvent is substantially immiscible with water in the proportions employed, i. e., that not more than approximately 5 per cent and preferably considerably less than 5 per cent of the solvent dissolves in the water used for hydrolysis.

The ketones that may be used include that class of ketones whose molecules have at least five and preferably not more than ten carbon atoms, at least three of which are connected in series, e. g., methyl propyl ketone, methyl isopropyl ketone, methyl butyl ketone, methyl isobutyl ketone, methyl amyl ketone, dipropyl ketone, diisopropyl ketone, ethyl propyl ketone, ethyl isopropyl ketone, ethyl butyl ketone and ethyl isobutyl ketone. Although ketones whose molecules contain more than about seven carbon atoms may be employed, they impart more color to the silicone-alkyd resins produced by the present method than the lower ketones which may be used. The preferred ketone solvents are methyl isobutyl ketone and methyl amyl ketone, methyl isobutyl ketone being more desirable because its lower boiling point permits it to be more readily removed from the final resin if desired.

The aliphatic monocarboxylic acid esters that may be employed in the present method include that class of esters which may be considered to be derived by esterification of an aliphatic monohydric alcohol having from 2 to 8 carbon atoms (e. g., ethanol, 1- or 2-propanol, 1- or 2-butanol, 1-, 2- or 3-pentanol, 1-, 2- or 3-hexanol, 1-, 2-, 3- or 4-heptanol or 1-, 2-, 3- or 4-octanol) with an aliphatic monocarboxylic acid whose molecules consists of a primary or secondary alkyl radical, having from two to three carbon atoms, whose free valence is connected to a carboxyl group (i. e., acetic acid, propionic acid, isobutyric acid and butyric acid), the total number of carbon atoms in the ester molecule being at least five and not greater than 10. Non-reactive substituents, such as halogen atoms having an atomic weight less than 80 (i. e., chlorine, bromine or fluorine atoms), may be present in an aliphatic radical derived from either the acid or the alcohol (provided, of course, that such substituents do not raise the boiling point of the ester above 200° C.).

Such aliphatic monocarboxylic acid esters include: n-propyl acetate, isopropyl acetate, n-butyl acetate, isobutyl acetate, secondary butyl acetate, tertiary butyl acetate, n-amyl acetate, isoamyl acetate, secondary amyl acetates, tertiary amyl acetate, n-hexyl acetate, isohexyl acetate, n-heptyl acetate, 2-ethylhexyl acetate, capryl acetate, ethyl propionate, isopropyl propionate, n-butyl propionate, secondary butyl propionate, isobutyl propionate, n-amyl propionate, isoamyl propionate, ethyl butyrate, n-propyl butyrate, n-butyl butyrate, isobutyl butyrate, n-amyl butyrate, isoamyl butyrate, isobutyl isobutyrate and isoamyl isobutyrate.

The preferred organic solvents are isopropyl acetate and n-butyl acetate, since these solvents not only are readily available but also have boiling points sufficiently low so that they can be rapidly distilled from the final resins and replaced with other less expensive solvents such as xylene.

Other solvents which dissolve only the silanes include the ethers and the higher alcohols.

It is usually desirable to use a substantial amount of a solvent or solvents (e. g., from about 100 to about 300 ml. of solvents per gram mol of silanes). In some instances (e. g., when the silanes are hydrolyzable only with comparative difficulty) it is desirable to use considerably less solvent, while in still other instances (e. g., when the silanes are particularly easy to hydrolyze) it is desirable to use somewhat more solvent.

It has been found that the hydrolysis is usually substantially complete within from about 5 to about 10 minutes after the addition of the silanes to the hydrolyzing solution has been completed. Apparently, leaving the silanes in contact with the hydrolyzing solution for longer periods of time has no deleterious effect on the resulting products. In fact, it is usually desirable to continue agitation of the mixture for about 15 to 30 minutes after addition of the silanes to the hydrolyzing solution is complete. The silane layer is then allowed to separate from the water layer (e. g., in a separatory funnel) and the water layer is drawn off and extracted with a water-immisicible solvent. This extract is combined with the silane layer. The separated solution of hydrolyzed silanes may be washed with water and dried, preferably by azeotropic distillation of the water along with a portion of the solvent. The solution also may be dried over such a drying agent as anhydrous calcium chloride or anhydrous sodium sulfate. Such a drying agent is then removed (e. g., by filtration) from the dried solvent solution of the hydrolysis products.

PROPERTIES OF SILOXANOL

The precautions hereinbefore described should be observed during the hydrolysis of the silanes in order to obtain a completely hydrolyzed product (siloxanol) having a molecular weight below 4,500 and an acid number above 5. These properties have been found to render the siloxanol highly reactive with an oil-modified alkyd resin. In order that the siloxanol may react readily with the alkyd resin, it is preferable that the siloxanol have a molecular weight below 3,000 and an acid number above 10. Excellent results have been obtained in the practice of the invention with siloxanols which had a molecular weight between 500 and 1,500 and an acid number of 10 to 50 or more. Such siloxanols were obtained by hydrolysis of a mixture of ethyltrichlorosilane and phenyltrichlorosilane, using butyl acetate or a mixture of butyl acetate and xylene as the solvent.

In order to obtain a siloxanol having satisfactory properties, it is highly desirable to hydrolyze a mixture of an aliphatic silane or silanes with an aromatic silane or silanes. If an aliphatic silane and an aromatic silane are hydrolyzed separately, and then mixed prior to reaction with the alkyd resin, it is very difficult to control the condensation, and great care must be exercised during the hydrolysis to prevent the production of extremely high molecular weight, unreactive siloxanols. Also, great care then must be taken during the reaction with the alkyd resin, because the danger of excessive condensation of the siloxanol molecules among themselves persists even during the reaction with the alkyd resin.

REACTION WITH ALKYD RESIN

It is usually preferable to add a dried solvent solution of the hydrolysis products to the alkyd resin and then to heat in order to effect condensation between the hydrolysis products and the alkyd resin. If desired, part of the organic solvent may be distilled from the hydrolysis products before admixture with the alkyd. Ordinarily, however, the excess solvent is removed after these components are mixed. When the products of the hydrolysis of a mixture of hydrolyzable organosilanes are mixed with an alkyd resin and the resulting mixture is heated, it is believed that water is formed by condensation of alcoholic hydroxyl groups in the molecules of the alkyd with hydroxyl groups attached to silicon atoms (to yield

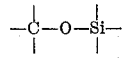

bonds). It usually is desirable to distill the water formed during the heating; it is convenient to accomplish this by effecting the heating under reflux, separating and returning to the resin mixture the material that boils substantially above 100° C. The reflux temperature is determined by the boiling point of the solvent, which should be between 100° C. and 300° C., and preferably is not more than 225° C. It is frequently advantageous to distill volatile matter other than water during the heating (when the hydrolysis solvent is diethyl ether the other volatile matter is the diethyl ether, and this is distilled while the resin mixture is being heated to the final reflux temperature). However, when the hydrolysis is conducted in a solvent that is to be present in the finished material, e. g., an aliphatic hydrocarbon, and no substantial excess of solvent is present (it is usually desirable that there be from about 15 to about 90 per cent solids in the finished resin and more desirable that the solids content be from about 50 to about 70 per cent), there is no reason to distill any volatile matter other than the water.

The alkyd resin can be reacted with the hydrolysis products of the hydrolyzable organosilanes directly, i. e., as it is received from the manufacturer, or it can be diluted with a solvent (e. g., any of the solvents hereinbefore described for use in the preparation of alkyd resins), so that the resulting silicone-alkyd resin will have about the desired amount of solvents. Alternatively, an alkyd resin produced specifically for reaction with the products of the hydrolysis of the hydrolyzable organosilanes may be used, or the desired amount of a solvent or solvent mixture may be added to the mixture of the alkyd resin and the hydrolysis products before the mixture is heated.

The weight of the silicone portion of the present silicone-alkyd resin is calculated herein as though all hydroxyl groups attached to silicon atoms in the siloxanol reactant were completely condensed during the reaction by which the silicone-alkyd resin is obtained. The weight of the silicone portion of the final resin is then the sum of the weight of (1) the silicon atoms, (2) the non-hydrolyzable groups attached directly to silicon atoms, (3) the oxygen atoms connecting silicon atoms by

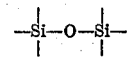

linkages, and (4) half the weight of the oxygen atoms in the

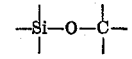

linkages that have replaced alcoholic hydroxyl groups in the alkyd resin molecules.

Ordinarily a siloxanol is used in the practice of the invention in organic solvent solution. The weight of siloxanol (on a completely condensed basis) in a solution can be determined, for example, by pouring a sample of the solution on a glass plate and baking the plate until the film is completely cured. The weight of the completely cured film is then the weight, on a completely condensed basis, of the siloxanol in the sample of the solution. Similarly, the solids content of a solution of an alkyd resin is simply that proportion remaining after low temperature (105 degrees C.) removal of the solvent.

Compositions embodying the invention containing higher silicone contents have slower rates of drying. On the other hand, a higher proportion of aliphatic silicones as compared to aromatic silicones tends to reduce the shelf life of the compositions.

For compositions capable of air-drying in 24 hours or less, the preferred silicone content is from 20 to 35 per cent. Such compositions may be made from long oil alkyds. Low-bake compositions may be made from medium oil alkyds and may have a silicone content up to 50 per cent. However, a resin of the present invention having a silicone content of 20 to 35 per cent produces coatings of adequate weather and chemical resistance.

The importance of adequate silicone content in the present resins is illustrated by the fact that a spectacular improvement in the weather resistance of the dried coatings occurs when the silicone content of the present resins is increased above 20 per cent.

The rate of drying of a composition embodying the invention is determined by the nature and proportion of the solvent as well as by the nature and proportions of the other ingredients used in preparing the composition. The use of a lower boiling aliphatic hydrocarbon solvent such as V. M. & P. naphtha results in faster drying, but a somewhat higher boiling solvent such as mineral spirits is less likely to produce a strong odor and also permits the coating to flow out more satisfactorily before it becomes stiff.

In determining the time required for drying, a coating may assumed to be dry when it is tack-free, i. e., when the film is in such a condition that a fingerprint may be rubbed out. The usual time for air-drying of a composition embodying the invention is about 6 hours under ordinary atmospheric conditions, although a composition that dries in 24 hours may still be considered to be air-drying. Under forced drying or low bake conditions, at temperatures from 150 degrees F. to 325 degrees F., drying of a composition embodying the invention may require only 3 to 120 minutes. Many silicone-alkyds heretofore known have required baking temperatures of 350 to 500° F.

*Example 1*

Ethyltrichlorosilane (160 grams) and phenyltrichlorosilane (160 grams) are mixed with xylene (320 ml.). The resulting solution is added dropwise with stirring to water (1750 ml.) which is cooled by means of glass coils through which is pumped a Dry Ice-cooled mixture of ethylene glycol and water. The rate of silane addition is controlled so that the temperature of the reaction mixture is maintained at 0 to 10 degrees C. When the silane addition is complete, stirring of the mixture is continued for about 15 minutes without further cooling. The mixture is then permitted to separate into two layers (in a separatory funnel). The water layer is withdrawn and the xylene layer is washed with water (2 portions of 350 ml. each). Thereafter the water layer is separated in a separatory funnel. The molecular weight of this siloxanol is found to be about 1700. The washed xylene layer is then mixed with a soya-modified alkyd resin, prepared by the following procedure: Alkali refined soya oil (1130 grams), technical pentaerythritol (225 grams), and a 5 per cent solution of calcium naphthenate (4.5 grams) are heated in a flask fitted with a condenser and an inlet tube through which a moderate stream of carbon dioxide is passed over the surface of the reaction mixture, for one hour at a temperature of 235 degrees C. The solution is then cooled and phthalic anhydride (434 grams) and maleic anhydride (9 grams) are added. The resulting mixture is heated for six hours at a temperature of 235 degrees C. and then is cooled. "Varnolene" (mineral spirits) is added to 420 grams of the resulting resin to dilute the resin to a 70 per cent solids concentration. The acid number of the resulting solution is 4, the color 5 (Gardner-Holdt) and the viscosity $Z_1$ (Gardner-Holdt). The mixture of the xylene solution of the hydrolysis products and the 420 grams of alkyd resin (diluted with mineral spirits) is placed in a flask equipped with a Dean-Stark trap, and xylene is distilled while the solution is maintained in gentle reflux for about 2 hours, until a sample of the resin solution forms a clear film on a glass plate upon baking for 5 minutes at 350 degrees C. Varnolene is then added to dilute the product to 60 per cent solids. The resulting silicone-modified alkyd solution has a color of 5 (Gardner-Holdt), a viscosity of T (Gardner-Holdt) and an acid number of 3.3 (based on resin solids). If the product is diluted only to 80 per cent instead of 60 per cent solids, the resulting semi-solid resin has a color of 7 (Gardner-Holdt), and an acid number of 5.5 (based on resin solids). This semi-solid resin is useful for application to textiles.

A 100 gram sample of the product having a concentration of 60 per cent solids is ground with 60 grams of rutile (Du Pont R110), a naphthenate drier solution (containing 0.6 gram of lead and 0.08 gram of cobalt) and 40 grams of Varnolene. The resulting air-drying enamel, when sprayed on a steel panel, is "set to touch" in 1 hour and is "dry" in 3½ hours. The panel then is exposed outdoors in southern Florida. The initial gloss of the panel is 91. After sixteen months of weathering, the gloss of the panel has not yet decreased to a value of 30 (the gloss readings are taken with a Gardner gloss meter in the manner hereinbefore described).

*Example 2*

A silicone-modified alkyd solution embodying the invention, having a concentration of 60 per cent solids, is prepared by the procedure of Example 1, except that the siloxanol or hydrolysis product is prepared by substituting an equal volume of butyl acetate for the xylene in order to obtain a molecular weight of about 900 and the alkyd resin solution is prepared as follows:

Soya fatty acids (1034 grams), phthalic anhydride (415 grams), maleic anhydride (2.9 grams), and technical pentaerythritol (348 grams) are heated using the apparatus described in Example 1 at a temperature of 235 degrees C. until the acid number is below 10. After the resin has cooled, Varnolene is added to 420 grams of the resin to dilute it to a concentration of 70 per cent solids. The acid number of the resulting solution is 4, the color is 4, and the viscosity is $Z_2$.

After reaction with the hydrolysis products and dilution to a concentration of 60 per cent solids, the silicone-modified alkyd solution has a color of 7, a viscosity of V and an acid number of 7.8 (based on resin solids). This composition is suitable for general architectural use, and when sprayed on a panel is "set to touch" in 1½ hours and is "dry" in 7 hours. When the panel is tested by outdoor exposure in southern Florida its gloss does not decrease to a value of 30 in sixteen months, the test being conducted in the manner described in Example 1.

When an alkyl resin prepared as described in this example, unmodified with silicones, is diluted with Varnolene to a concentration of 60 per cent solids and is sprayed on a panel, it is "set to touch" in 1½ hours and is "dry" in 6 hours. When the panel is tested in the same manner by outdoor exposure in southern Florida, its gloss decreases to a value of 30 in only seven months.

*Example 3*

The procedure of Example 1 is repeated, except that the 70 per cent solution of an alkyd resin is prepared as follows:

Degummed soya oil (952 grams), glycerol (203 grams) and litharge (1 gram) are heated in the apparatus described in Example 1 for one hour at a temperature of 245 degrees C. The solution is then cooled and phthalic anhydride (565 grams), maleic anhydride (12.5 grams), glycerol (59 grams) and triphenylphosphite (2.9 grams) are added. The resulting mixture is heated for 6 hours at 240° C. and is then cooled. Varnolene is then added to 420 grams of the resulting resin to dilute the resin to a 70 per cent solids concentration. The 60 per cent solution of a silicone-modified alkyd resin obtained from the alkyd resin so prepared has a color of 5, a viscosity of X and an acid number of 8.6 (based on resin solids). This medium oil composition is suitable for use in general purpose enamels, particularly those intended for interior maintenance. When sprayed on a panel, it is "set to touch" in 1 hour and is "dry" in 7½ hours.

When this composition is tested by outdoor exposure in southern Florida in the manner described in Example 1, the gloss does not decrease to a value of 30 in sixteen months. In contrast, when the alkyd resin used in producing this composition is diluted to only 60 per cent solids instead of 70 per cent solids and is tested in the same manner, the gloss decreases to a value of 30 in six and one-half months. This alkyd resin, when sprayed on a panel, is "set to touch" in 1 hour and is "dry" in 5 hours.

*Example 4*

The procedure of Example 1 is repeated, except that the 70 per cent alkyd resin solution is prepared as follows:

Soya fatty acids (1024 grams), technical dipentaerythritol (41 grams), technical pentaerythritol (316 grams), maleic anhydride (10 grams), and phthalic anhydride (409 grams) are heated in the apparatus described in Example 1 at a temperature of 240 degrees C. until the acid number is below 10. After the resin has cooled, Varnolene is added to 420 grams of the resin to dilute it to a concentration of 70 per cent solids. After completion of the reaction with the hydrolysis products, Varnolene is added to dilute the product to 50 per cent solids. The resulting solution has a color of 5, a viscosity of W and an acid number of 9.4 (based on resin solids). It is useful for general architectural purposes.

*Example 5*

The procedure of Example 1 is repeated, except that the 70 per cent alkyd resin solution is prepared as follows:

Degummed soya oil (866 grams), glycerol (190 grams), and litharge (1 gram) are heated in the apparatus described in Example 1 for one hour at a temperature of 245 degrees C. The solution is then cooled and phthalic anhydride (604 grams), maleic anhydride (11 grams), glycerol (126 grams) and triphenylphosphite (2.6 grams) are added. The resulting mixture is heated for six hours at 235 degrees C. and is then cooled. Varnolene is added to 420 grams of the resulting resin to dilute the resin to a concentration of 70 per cent solids. After reaction of this resin with the hydrolysis products, Varnolene is added to dilute the product to 55 per cent solids. The resulting solution has a color of 5, a viscosity of X and an acid number 19.5 (based on resin solids). When sprayed on a surface, it is "set to touch" in 1½ hours and is "dry" overnight.

The "average molecular weight" of a siloxanol, as used herein, means the molecular weight determined by the elevation of the boiling point of benzene; using a Menzies-Wright molecular weight apparatus, with a differential type water thermometer, calibrated against benzil. (Molecular weights above 2,000 determined in this manner are approximate).

The "acid number" of a siloxanol, as used herein, means the number of milligrams of potassium hydroxide (in alcohol solution) required per gram of siloxanol (on a completely condensed basis) to neutralize a xylene solution of the siloxanol in a rapid titration to the first permanent pink end point with phenolphthalein. (Because of the use of an organic solvent, such an acid number gives an indication rather than an absolute determination of acidity).

Having described the invention, I claim:

1. A coating composition that produces coatings of superior weather and chemical resistance, comprising an aliphatic hydrocarbon solution of the product of the heat-condensation of (1) an oil-modified alkyd resin with (2) a completely hydrolyzed acidic siloxanol having a molecular weight below 4500, an acid number above 5 and containing alkyl and aryl groups directly attached to different silicon atoms, said siloxanol containing from two to three alkyl and aryl groups for every two silicon atoms, and containing from one to twenty-eight alkyl groups for every eight aryl groups, and the weight of said siloxanol, on a fully condenser basis, constituting from 15 to 50 per cent of said condensation product.

2. A coating composition that produces coatings of superior weather and chemical resistance upon drying at temperatures below 325 degrees F., comprising an aliphatic hydrocarbon solution of the product of the heat-condensation of (1) an oil-modified aromatic dicarboxylic acid glyceride resin with (2) a completely hydrolyzed siloxanol having an average molecular weight below 4,500 and an acid number above 5 and containing alkyl and aryl groups directly attached to different silicon atoms, said siloxanol containing from two to three alkyl and aryl groups for every two silicon atoms, and containing from one to twenty-eight alkyl groups for every eight aryl groups, and the weight of said siloxanol, on a fully condensed basis, constituting from 15 to 50 per cent of said condensation product.

3. A coating composition that produces coatings of superior weather and chemical resistance upon drying at ordinary temperatures, comprising an aliphatic hydrocarbon solution of the product of the heat-condensation of (1) a drying oil-modified alkyd resin with (2) a completely hydrolyzed siloxanol having an average molecular weight below 3,000 and an acid number above 10 and containing alkyl and aryl groups directly attached to different silicon atoms, said siloxanol containing from two to three alkyl and aryl groups for every two silicon atoms, and containing from one to twenty-eight alkyl groups for every eight aryl groups, and the weight of said siloxanol, on a fully condensed basis, constituting from 20 to 35 per cent of said condensation product.

4. A coating composition as claimed in claim 1 wherein the weight of the siloxanol, on a fully condensed basis, constitutes from 20 to 35 per cent of the condensation product.

5. A coating composition as claimed in claim 1 wherein there are from one to four alkyl groups in the siloxanol for every three aryl groups.

6. A coating composition that produces coatings of superior weather and chemical resistance, comprising an aliphatic hydrocarbon solution of the product of the heat-condensation of (1) an oil-modified aromatic dicarboxylic acid glyceride resin with (2) a completely hydrolyzed acidic siloxanol having a molecular weight below 3000 and an acid number above 10 and containing primary alkyl and phenyl groups directly attached to different silicon atoms, said siloxanol containing from four to five alkyl and phenyl groups for every four silicon atoms, and containing from one to four alkyl groups for every three phenyl groups, and the weight of said siloxanol, on a fully condensed basis, constituting from 20 to 35 per cent of said condensation product.

7. A coating composition as claimed in claim 6 wherein the alkyl groups in the siloxanol are ethyl groups.

8. A coating composition that produces coatings of superior weather and chemical resistance upon drying at ordinary temperatures, comprising an aliphatic hydrocarbon solution of the product of the heat-condensation of (1) a drying oil-modified alkyd resin with (2) a completely hydrolyzed siloxanol having an average molecular weight below 3,000 and an acid number above 10 and containing ethyl and phenyl groups directly attached to different silicon atoms, said siloxanol containing from four to five ethyl and phenyl groups for every four silicon atoms, and containing from two to four ethyl groups for every three phenyl groups, and the weight of said siloxanol on a fully condensed basis, constituting from 20 to 35 per cent of said condensation product.

9. A method of making a coating composition that is soluble in aliphatic hydrocarbons and produces coatings of superior weather and chemical resistance, comprising the steps of hydrolyzing a mixture of an alkyl silane and an aryl silane, containing from two to three alkyl and aryl groups for every two silicon atoms, and containing from one to twenty-eight alkyl groups for every eight aryl groups, at a pH below 7 in a solvent medium comprising an organic solvent having a boiling point below 200 degrees C. that forms a two-phase system with the water used for hydrolysis, which organic solvent has a molecular structure containing from one to two oxygen atoms which are connected only to carbon atoms and at least one of which is contained in a carbonyl radical connected to two polyvalent atoms of the class consisting of oxygen and carbon atoms, said oxygen atoms if more than one in number being contained in an ester linkage, thereby to obtain a solution, in said solvent medium, of a completely hydrolyzed siloxanol having a molecular weight below 4500 and an acid number above 5, and heat-condensing a solution containing from three to seventeen parts, on a fully condensed basis, of the hydrolyzed siloxanol, and comprising such an organic solvent, with seventeen parts of an oil-modified alkyd resin.

10. An air-drying coating composition comprising a solution in an aliphatic hydrocarbon solvent of the product of the heat-condensation at a pH below 7 of (1) a long oil phthalic glyceride resin having an acid number of les than 10 and an excess of hydroxyl groups and (2) an acidic, completely hydrolyzed siloxanol having an average molecular weight below 3000, an acid number above 10, and containing ethyl and phenyl groups attached directly to different silicon atoms, said siloxanol containing from four to five ethyl and phenyl groups for every four silicon atoms, and containing about equal proportions of ethyl and phenyl groups, and the weight of said siloxanol on a fully condensed basis, constituting from 20 to 35 per cent by weight of said condensation product.

11. A method of making an air-drying coating composition that is soluble in aliphatic hydrocarbons and produces coatings of superior weather and chemical resistance, comprising the steps of hydrolyzing with water a solvent solution of a mixture of an alkyl and a phenyl silane, containing from four to five alkyl and phenyl groups, each of which are attached directly to different silicon atoms, for every four silicon atoms, and containing from two to four alkyl groups for every three phenyl groups, under acidic conditions induced by a mineral acid, said hydrolysis solvent being selected from the class consisting of aliphatic monocarboxylic acid esters and aliphatic ketones containing from five to ten carbon atoms and that are soluble to an extent of less than 5 per cent by weight in the water used for hydrolysis, that form a two-phase system therewith, and which have a boiling point less than 200° C., thereby to obtain a solution, in said solvent, of an acidic, completely hydrolyzed siloxanol having a molecular weight below 3000 and an acid number above 10, and refluxing under acidic conditions a mixed solution, comprising said solvent and the said siloxanol with a drying oil modified alkyd resin until a film of the heat-condensation product on a glass plate is clear upon baking for five minutes at 350° C., said siloxanol, on a completely condensed basis, constituting from 20 to 35 per cent by weight of said condensation product.

References Cited in the file of this patent

UNITED STATES PATENTS

| | | |
|---|---|---|
| 2,605,243 | Sowa | July 29, 1952 |
| 2,607,755 | Bunnell | Aug. 19, 1952 |

FOREIGN PATENTS

| | | |
|---|---|---|
| 583,754 | Great Britain | Dec. 30, 1946 |